(12) United States Patent
Seo et al.

(10) Patent No.: US 9,276,721 B2
(45) Date of Patent: Mar. 1, 2016

(54) DECODING DATA IN GROUP SEARCH SPACE BASED ON GROUP CONTROL INFORMATION

(75) Inventors: Dong Youn Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 14/239,058

(22) PCT Filed: Aug. 16, 2012

(86) PCT No.: PCT/KR2012/006497
§ 371 (c)(1),
(2), (4) Date: Feb. 14, 2014

(87) PCT Pub. No.: WO2013/025050
PCT Pub. Date: Feb. 21, 2013

(65) Prior Publication Data
US 2014/0169324 A1  Jun. 19, 2014

Related U.S. Application Data

(60) Provisional application No. 61/523,826, filed on Aug. 15, 2011.

(51) Int. Cl.
| | |
|---|---|
| *H04L 5/00* | (2006.01) |
| *H04W 72/04* | (2009.01) |
| *H04W 72/12* | (2009.01) |
| *H04L 27/26* | (2006.01) |
| *H04W 88/02* | (2009.01) |
| *H04L 1/16* | (2006.01) |
| *H04W 48/12* | (2009.01) |

(52) U.S. Cl.
CPC .............. *H04L 5/005* (2013.01); *H04L 1/1671* (2013.01); *H04L 5/001* (2013.01); *H04L 5/0037* (2013.01); *H04L 27/2647* (2013.01); *H04W 72/0446* (2013.01); *H04W 72/0453* (2013.01); *H04W 72/0466* (2013.01); *H04W 72/12* (2013.01); *H04W 88/02* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 2010/0067465 | A1* | 3/2010 | Miki et al. | 370/329 |
| 2011/0038275 | A1* | 2/2011 | Kim et al. | 370/252 |
| 2012/0281576 | A1* | 11/2012 | Yamada et al. | 370/252 |

FOREIGN PATENT DOCUMENTS

| | | | | |
|---|---|---|---|---|
| JP | WO 2011/065442 A1 * | 3/2011 | | H04W 72/04 |
| KR | 10-2007-0070376 A | 7/2007 | | |
| KR | 1020080078617 A | 8/2008 | | |
| KR | 10-2009-0116220 A | 11/2009 | | |
| KR | 10-2010-0065008 A | 6/2010 | | |
| WO | WO 2009/116816 A2 * | 9/2009 | | H04B 17/00 |

* cited by examiner

*Primary Examiner* — Ian N Moore
*Assistant Examiner* — Justin T Van Roie
(74) *Attorney, Agent, or Firm* — Dentons US LLP

(57) ABSTRACT

Provided is a method and apparatus for decoding data by a user equipment (UE) in a wireless communication system. The method comprises the following steps: receiving group control information identified by a group identifier (ID) allocated to a plurality of UEs including the UE, wherein the group control information includes scheduling information indicating a group search space that is a wireless resource area through which data for the plurality of UEs can be transmitted; receiving data through the group search space; and decoding the data on the basis of a unique ID of the UE in the group search space.

7 Claims, 19 Drawing Sheets

DECODING DATA IN GROUP SEARCH SPACE BASED ON GROUP CONTROL INFORMATION

This application is a 35 USC §371 National Stage entry of International Application No. PCT/KR2012/006497, filed on Aug. 16, 2012, and claims priority to U.S. Provisional Application No. 61/523,826 filed Aug. 15, 2011, each of which is hereby incorporated by reference in its entirety.

BACKGROUND OF THE INVENTION

1. Field of the Invention

The present invention relates to wireless communication, and more particularly, to a method and apparatus for decoding data in a wireless communication system.

2. Related Art

A $3^{rd}$ generation partnership project (3GPP) long term evolution (LTE) is very likely to be a next generation wireless communication system standard. In the LTE, when a base station transmits downlink data to a user equipment (UE), the base station first transmits scheduling information on a downlink data channel through a control channel, allocates a downlink data channel by the scheduling information, and transmits downlink data by the scheduling information. Even when the UE transmits uplink data to the base station, first, the base station transmits scheduling information on the uplink data channel through the control channel, and the UE transmits uplink data channel through the uplink data channel allocated by the scheduling information.

Furthermore, the 3GPP LTE-A is a wireless communication system standard which has improved the LTE. The LTE-A may support a low price/low performance UE which is mainly used for data communication such as gauge examination, level measurement, utilization of a monitoring camera, and the inventory reporting of a vending machine. Likewise, such a UE is commonly called as a machine type communication (MTC) UE.

In the case of the MTC UE, the amount of data transmitted may be small and the number of UEs operated in one cell may be large. As such, the conventional data decoding method, that is, the method of receiving scheduling information for the data channel through the control channel for each terminal and decoding data in a wireless resource area designated by the scheduling information may be low in the efficiency of resource utilization.

SUMMARY OF THE INVENTION

An object of the present invention is to provide a method and apparatus for decoding data in a wireless communication system.

In accordance with an aspect of the present invention, a method of decoding data of a user equipment (UE) in a wireless communication system includes receiving group control information identified by a group identifier (ID) allocated to a plurality of UEs including the UE, receiving data from a group search space, and decoding the data based on the UE's unique ID in the group search space, wherein the group control information includes scheduling information which indicates a group search space which is a wireless resource area where data for the plurality of UEs may be transmitted.

In accordance with another aspect of the present invention, a user equipment (UE) includes a radio frequency (RF) unit which transmits and receives a wireless signal, and a processor connected to the RF unit, wherein the processor receives group control information identified by a group identifier (ID) allocated to a plurality of UEs including the UE, receives data in a group search space, and decodes the data based on the UE's unique ID in the group search space, wherein the group control information includes scheduling information which indicating the group search space which is a wireless resource area where data for the plurality of UEs may be transmitted.

The present invention is advantageous in that, in a wireless communication system which supports an MTC user equipment, waste of wireless resources may be prevented and data communication may be efficiently performed.

DESCRIPTION OF EXEMPLARY EMBODIMENTS

A user equipment (UE) may be fixed or mobile, may also be referred to as a mobile station (MS), a mobile terminal (MT), a user terminal (UT), a subscriber station (SS), a wireless device, a personal digital assistant (PDA), a wireless modem, and a handheld device.

The base station (BS) refers to a fixed station which is generally communicated with a UE, and may also be referred to as a evolved-NodeB (eNB), a base transceiver system (BTS), and an access point (AP).

Hereinafter, the application of the present invention to 3GPP LTE based on 3GPP TS release 8 or 3GPP LTE-A based on 3GPP TS release 10 or a later standard thereof will be described. This is merely an example, and the present invention may be applied to various wireless communication networks.

Figure 1:
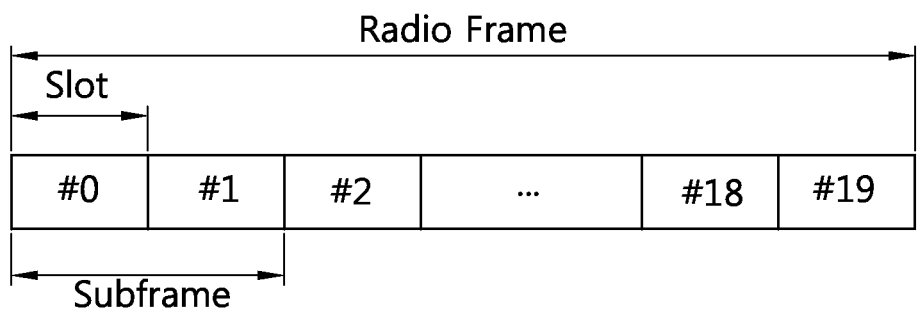
FIG. 1 shows a radio frame structure.

FIG. 1 shows a radio frame structure.

Referring to FIG. 1, a radio frame includes 10 subframes in a time domain, and one subframe includes 2 slots in the time domain. The length of one subframe may be 1 ms, and the length of one slot may be 0.5 ms. The time, which takes in the transmission of one subframe is called a transmission time interval (TTI). The TTI may be the minimum unit of scheduling.

Figure 2:
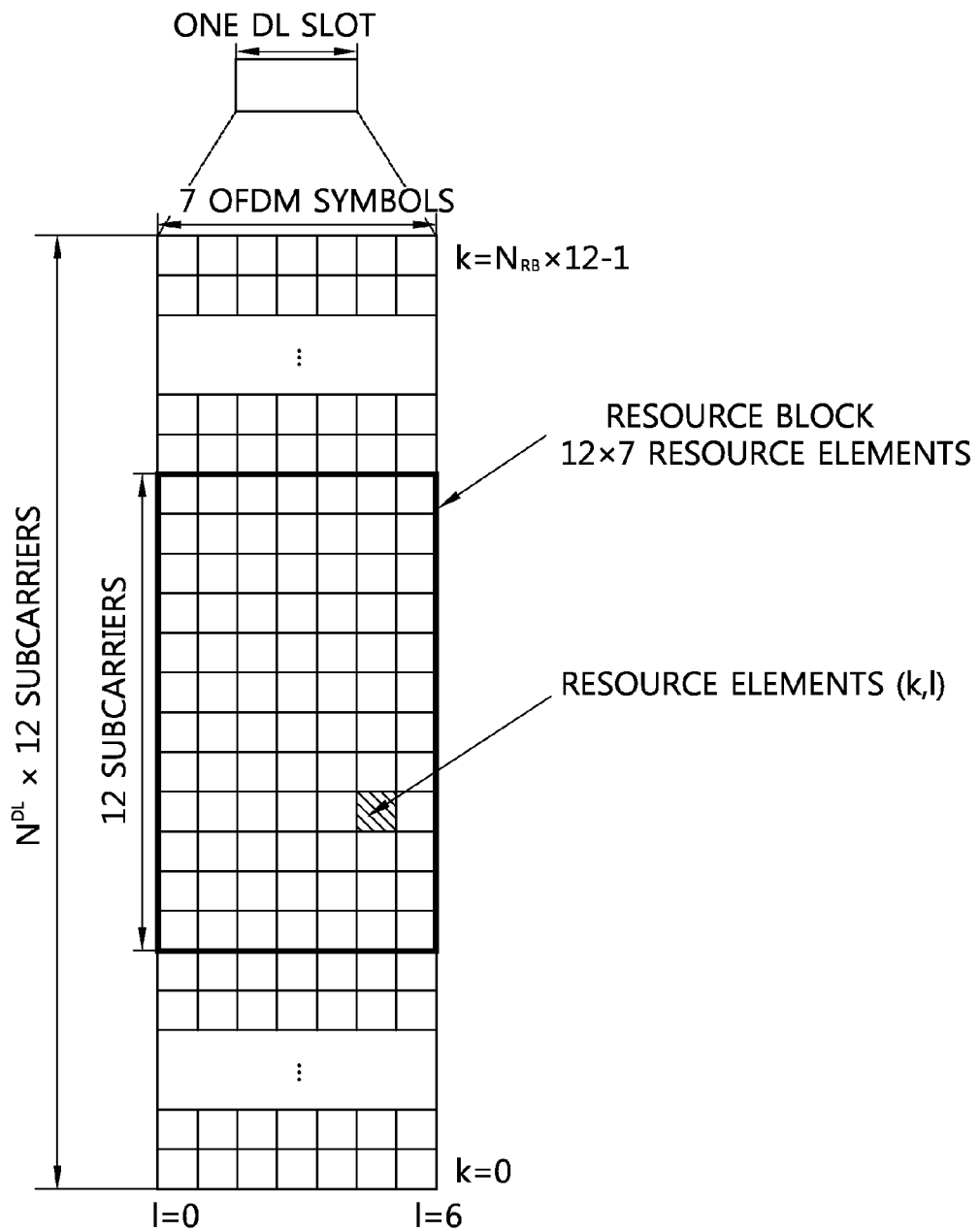
FIG. 2 shows an example of a resource grid for one downlink slot.

FIG. 2 shows an example of a resource grid for one downlink slot.

Referring to FIG. 2, the downlink slot includes a plurality of orthogonal frequency division multiplexing (OFDM) symbols in the time domain, and includes $N_{RB}$ resource blocks in the frequency domain. The resource block includes one slot in the time domain and a plurality of continuous subcarriers in the frequency domain. The $N_{RB}$, which is the number of resource blocks included in the downlink slot is dependent on the downlink transmission bandwidth which is set in the cell. For example, in the LTE system, $N_{RB}$ may be one of 6 to 110. The structure of the uplink slot may also be the same as that of the downlink slot.

Each element on the resource grid is called a resource element (RE). The resource element on the resource grid may be identified by the index pair (k, l). Here, k (k=0, . . . , $N_{RB} \times 12-1$) is the subcarrier index within the frequency domain, and l (l=0, . . . , 6) is the OFDM symbol index within the time domain.

FIG. 2 illustrates that one resource block is composed of 7 OFDM symbols in the time domain and 12 subcarriers in the frequency domain and includes 7×12 resource elements, but the number of OFDM symbols and the number of subcarriers within the resource block is not limited thereto. The number of OFDM symbols and the number of subcarriers may be variously changed according to the length of the CP and the frequency spacing, etc. On one OFDM symbol, the number of subcarriers may be one of 128, 256, 512, 1024, and 2048.

One slot may include a plurality of OFDM symbols in the time domain. The 3GPP LTE uses the OFDMA in the downlink, and thus one symbol period is expressed as the OFDM symbol. The OFDM symbol may be called another name depending on the multiple access scheme. For example, SC-FDMA is used as the uplink multiple access scheme, the symbol may be called the SC-FDMA symbol. It is illustrated that one slot includes 7 OFDM symbols, but the number of OFDM symbols included in one slot may be changed according to the length of the cyclic prefix (CP). According to 3GPP TS 36.211 V8.5.0 (2008-12), in the normal CP, one subframe includes 7 OFDM symbols, and in the extended CP, one subframe includes 6 OFDM symbols. The structure of the wireless frame is merely an example, the number of subframes included in the wireless frame and the number of slots included in the subframe may be variously changed.

Figure 3:
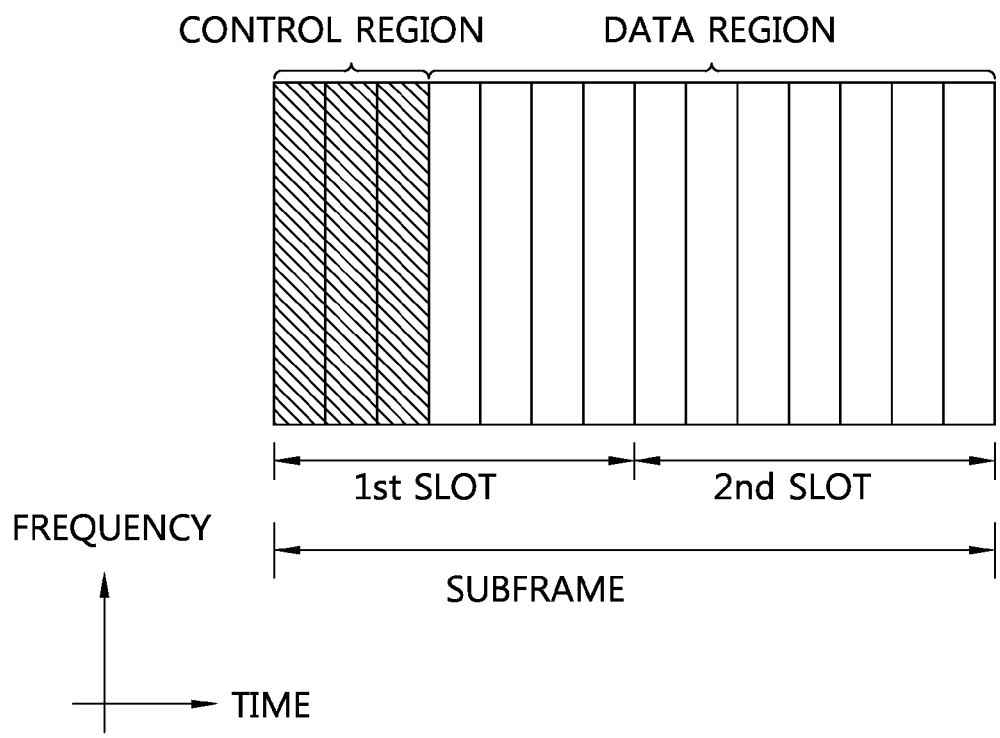
FIG. 3 shows an example of a downlink subframe structure.

FIG. 3 shows an example of a downlink subframe structure.

The downlink subframe is divided into a control region and a data region in the time domain. The control region includes 4 OFDM symbols maximum before the first slot, but the number of OFDM symbols included in the control region may be changed. The physical downlink control channel (PDCCH) and other control channels are allocated to the control region, and the physical downlink shared channel (PDSCH), which is a data channel, is allocated to the data region.

As disclosed in 3GPP TS 36.211. V10.2.0, the physical channels in the 3GPP LTE/LTE-A may be divided into the PDSCH and the PUSCH which are data channels, and the PDCCH, the physical control format indicator channel (PCFICH), the physical hybrid-ARQ indicator channel (PHICH), and the physical uplink control channel which are control channels.

The control format indicator (CFI) about the number of OFDM symbols (i.e., the size of the control region) used in the transmission of the control channels within the subframe is carried on the PCFICH, which is transmitted in the first OFDM symbol of the subframe. The UE first receives the CFI through the PCFICH and then monitors the PDCCH.

Unlike the PDCCH, the PCFICH does not use the blind decoding and is transmitted through the fixed PCFICH resources.

The positive acknowledgement (ACK) and negative acknowledgement (NACK) signal for the uplink hybrid automatic repeat request (HARQ) are carried on the PHICH. The ACK/NACK signal about the uplink data on the PUSCH transmitted by the UE is transmitted on the PHICH.

The physical broadcast channel is transmitted in 4 OFDM symbols before the second slot of the first subframe of the wireless frame. The system information, which is essential for communication between the UE and the base station, is carried on the PBCH, and the system information transmitted through the PBCH is called a master information block (MIB). In comparison, the system information, which is transmitted on the PDSCH indicated by the PDCCH, is called a system information block (SIB).

The control information transmitted through the PDCCH is called downlink control information (DCI). The DCI may include the resource allocation of the PDSCH (this is called a downlink grant), the resource allocation of the PUSCH (this is called a uplink grant), and activation of a voice Internet protocol (VoIP) and/or a set of transmission power control commands on individual UEs within an arbitrary UE group.

The base station determines the PDCCH format according to the DCI, then a cyclic redundancy check (CRC) is attached to the DCI, and a unique identifier (this is called a radio network temporary identifier (RNTI)) is masked to the CRC according to the owner or usage of the PDCCH.

The control region within the subframe includes a plurality of control channel elements (CCEs). The CCE is a logical allocation unit used to provide the encoding rate according to the state of the wireless channel to the PDCCH, and corresponds to the plurality of resource element groups (REGs). The REG includes a plurality of resource elements. The format of the PDCCH and the possible number of bits of the PDCCH are determined according to the relation between the number of CCEs and the encoding rate provided by the CCEs.

One REG includes 4 REs, and one CCE includes 9 REGs. {1, 2, 4, 8} CCEs may be used to form one PDCCH, and each of {1, 2, 4, 8} may be called an aggregation level.

The number of CCEs used in the PDDCH transmission is determined according to the channel status of the base station. For example, one CCE may be used in the PDCCH transmission to the UE having a good downlink channel state. 8 CCEs may be used in the PDCCH transmission to the UE having a poor downlink channel state.

The control channel composed of one or more CCEs performs interleaving in REG units, and the cyclic shift is performed based on the cell identifier (ID) so as to be mapped to the physical resources thereafter.

In the 3GPP LTE, the blind decoding is used for detection of PDCCH. The blind decoding is a scheme of determining whether the PDCCH is its own control channel by checking the CRC error by demasking a desired identifier (RNTI) to the CRC of the received PDCCH (this is called a PDCCH candidate). The UE does not recognize at which position of the control region the UE's own PDCCH is transmitted using which CCE set level or DCI format.

A plurality of PDCCHs may be transmitted within on subframe. The UE monitors a plurality of PDCCHs for each subframe. Here, the monitoring refers to the UE's attempt to decode the PDCCH according to the monitored PDCCH format.

In the 3GPP LTE, a search space is used to reduce the load due to the blind decoding. The search space may be a monitoring set of the CCE for the PDCCH. The UE monitors the PDCCH within the corresponding search space.

The search space may be divided into a common search space (CSS) and a UE-specific search space (USS). The common search space is a space for searching for the PDCCH having the common control information and is composed of 16 CCEs of 0 to 15, and supports the PDCCH having the CCE set level of $\{4, 8\}$. However, the PDCCH (DCI format 0, 1A), through UE-specific information is transmitted, may be transmitted to the common search space. The UE-specific search space supports the PDCCH having the CCE set level of $\{1, 2, 4, 8\}$.

Table 1 below represents the number of PDCCH candidates which are monitored by the UE.

TABLE 1

| Search Space Type | Aggregation level L | Size [In CCEs] | Number of PDCCH candidates | DCI formats |
| --- | --- | --- | --- | --- |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of the search space is determined by Table 1 above, and the start point of the search space is defined differently in the common search space and the UE-specific search space. The start point of the common search space is fixed regardless of the subframe, but the start point of the UE-specific search space may become different for each subframe, according to the UE identifier (e.g., C-RNTI), the CCE set level and/or the slot number within the wireless frame. When the start point of the UE-specific search space is located within the common search space, the UE-specific search space and the common search space may overlap.

In the CCE set level L∈$\{1,2,3,4\}$, the search space $S^{(L)}_k$ is defined as a set of the PDCCH candidates. The CCE corresponding to the PDCCH candidate m of the search space $S^{(L)}_k$ is as follows.

$$L \cdot \{(Y_k+m) \bmod \lfloor N_{CCE,k}/L \rfloor\} + i \qquad \text{Equation 1}$$

Here, i=0, 1, . . . , L−1, m=0, . . . , $M^{(L)}$−1, $N_{CCE,k}$ is the total number of CCEs which may be used in the PDCCH transmission within the control region of subframe k. The control region includes a set of CCEs which are numbered from 0 to $N_{CCE,k}$−1. The $M^{(L)}$ is the number of PDCCH candidates in the CCE set level L in a given search space.

In the common search space, $Y_k$ is to 0 for two set levels L=4 and L=8.

In the UE-specific search space of the set level L, variable $Y_k$ is defined as follows.

$$Y_k=(A \cdot Y_{k-1}) \bmod D \qquad \text{Equation 2}$$

Here, $Y_{-1}=n_{RNTI}\neq 0$, A=39827, D=65537, k=floor($n_s$/2), $n_s$ is the slot number within the wireless frame. Floor (x) is the largest integer among numbers smaller than x.

Table 2 below shows the number of candidate PDCCHs in the search space.

TABLE 2

| PDCCH format | No. of CCEs | No. of candidate PDCCHs in common search space | No. of candidate PDCCHs in UE-specific search space |
| --- | --- | --- | --- |
| 0 | 1 | — | 6 |
| 1 | 2 | — | 6 |
| 2 | 4 | 4 | 2 |
| 3 | 8 | 2 | 2 |

In 3GPP LTE, the transmission of the downlink transmission block is performed as a pair of the PDCCH and the PDSCH. The transmission of the uplink transmission block is performed as a pair of the PDCCH and the PUSCH. For example, the UE receives the downlink transmission block through the PDSCH indicated by the PDCCH. The UE receives the downlink grant including the downlink resource allocation on the PDCCH by monitoring the PDCCH in the downlink subframe. The UE receives the downlink transmission block on the PDSCH which is indicated by the downlink resource allocation.

Figure 4:
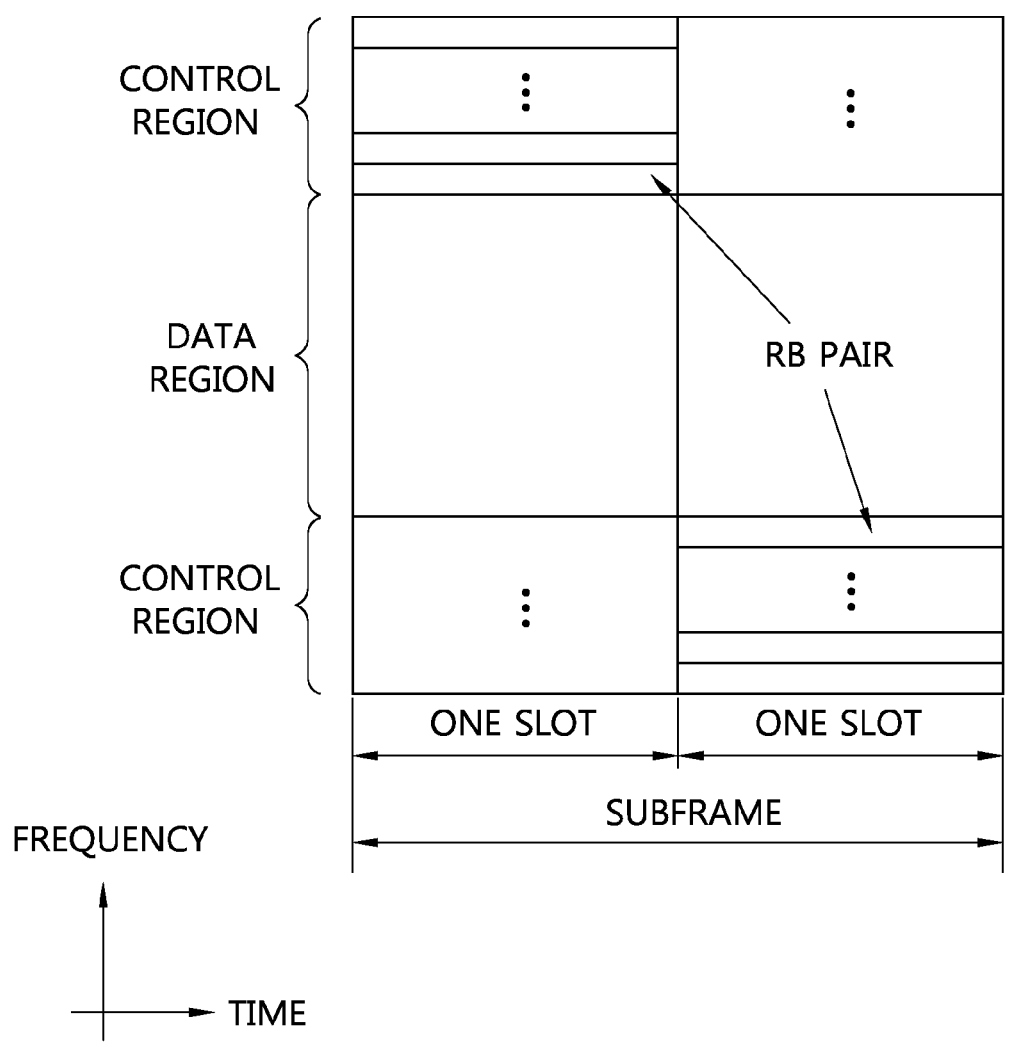
FIG. 4 shows an example of an uplink subframe structure.

FIG. 4 shows an example of an uplink subframe structure.

Referring to FIG. 4, the uplink subframe may be divided into a control region and a data region in the frequency domain. The physical uplink control channel for transmission of uplink control information is allocated to the control region. The physical uplink shared channel (PUSCH) for transmission of data (sometimes only control information, or including control information) is allocated to the data region. The UE may simultaneously transmit the PUCCH and the PUSCH, or only one of the PUCCH and the PUSCH may be transmitted depending on the setting.

The PUCCH for one UE is allocated to a resource block pair (RB pair) in the subframe. The resource blocks, which belong to the resource block pair, occupy different subcarriers in each of the first slot and the second slot. The frequency, which is occupied by the resource block which belongs to the resource block pair allocated to the PUCCH, is changed on the basis of the slot boundary. This is, the RB pair allocated to the PUCCH has been frequency-hopped in the slot boundary. A frequency diversity gain may be obtained by transmitting uplink control information through different subcarriers depending on the time.

The hybrid automatic repeat request (HARM), acknowledgement (ACK)/non-acknowledgement (NACK), channel status information (CSI) indicating the downlink channel state such as channel quality indicator (CQI), precoding matrix index (PMI), precoding type indicator (PTI), and rank indication (RI), etc. may be transmitted on the PUCCH. Periodic channel status information may be transmitted through the PUCCH.

The PUSCH is mapped to the uplink shared channel which is the transport channel. The uplink data transmitted to the PUSCH may be a transport block which is a data block for UL-SCH which is transmitted during TTI. The transmission block may include user data. Furthermore, the uplink data may be multiplexed data. The multiplexed data may be the multiplexing of the transmission block and the channel state information for UL-SCH. For example, the channel status information multiplexed in data may include CQI, PMI, and RI. Furthermore, the uplink data may be composed of channel status information only. The periodic or non-periodic channel status information may be transmitted through the PUSCH.

Figure 5:
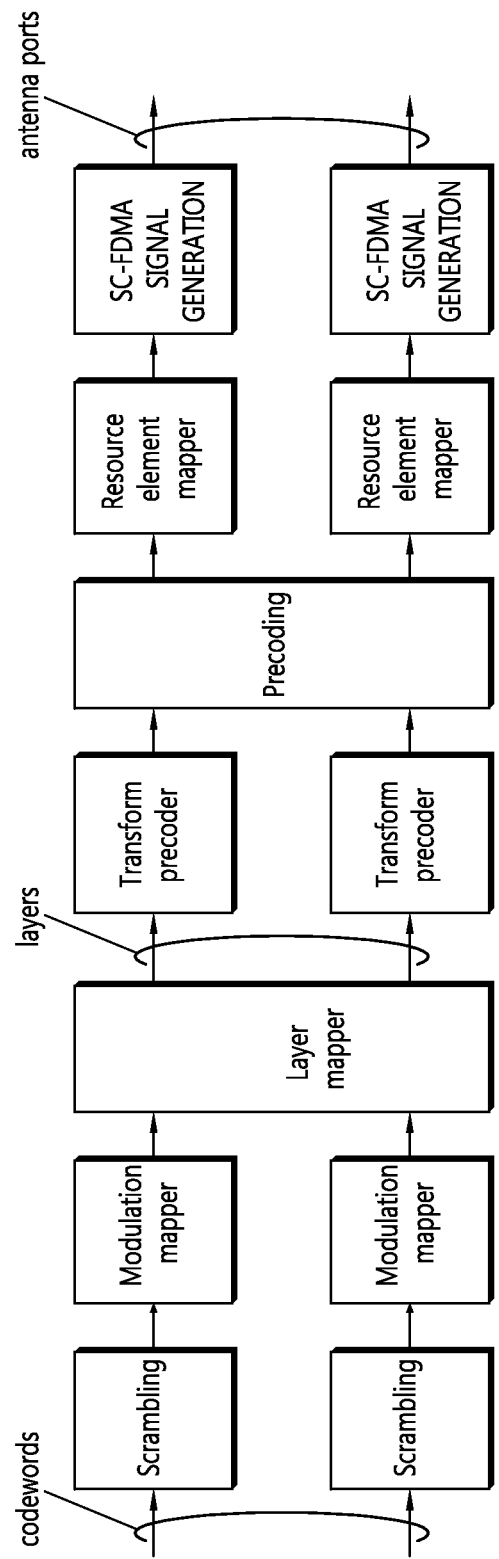
FIG. 5 shows an operation of processing a signal for PUSCH transmission in an LTE.

FIG. 5 shows an operation of processing a signal for PUSCH transmission in an LTE.

Referring to FIG. 5, coded data is formed by encoding data, which forms the transmission block, according to a predetermined coding scheme. The encoded data is called a codeword, and codeword b may be expressed as shown in Equation 3 below.

$$b^{(q)}(0), \ldots, b^{(q)}(M_{bit}^{(q)}-1) \quad \text{Equation 3}$$

Here, q is the index of the codeword, and $M^{(q)}_{bit}$ is the number of bits of q codeword.

Scrambling is performed for the codeword. When scrambled bits are $\tilde{b}^{(q)}(0), \ldots, \tilde{b}^{(q)}(M_{bit}^{(q)}-1)$, Equation 4 below may be expressed.

$$\tilde{b}^{(q)}(i)=(b^{(q)}(i)+c^{(q)}(i))\bmod 2 \quad \text{Equation 4}$$

Here, $c^{(q)}(i)$ is the scrambling sequence. The scrambling sequence may be given as shown in Equation 5 below.

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{Equation 5}$$

Here, Nc=1600, and the first m-sequence is initialized to $x_1(0)=1$, $x_1(n)=0$, $n=1,2,\ldots,30$. In the beginning of each subframe, initialization is performed as shown in $c_{init}=n_{RNTI}\cdot 2^{14}+q\cdot 2^{13}+\text{floor}(n_s/2)\cdot 2^9+N^{cell}_{ID}$ is the physical cell identity (PCI) of the cell, and $n_{RNTI}$ is a RNTI related with the PUSCH transmission, more specifically, a RNTI which is used in detecting the PDCCH that schedules the PUSCH. $n_s$ is the slot number within the wireless frame.

The scrambled codeword is modulated to a symbol that expresses the location of the signal constellation by the modulation mapper. There is no limit in the modulation scheme, and the scheme may be a m-phase shift keying (m-PSK) or a m-quadrature amplitude modulation (m-QAM). For example, the m-PSK may be BPSK, QPSK, or 8-PSK. The m-QAM may be 16-QAM, 64-QAM, or 256-QAM.

The modulated codeword goes through layer mapping, transform precoding by the conversion precoder, and precoding, so as to be mapped to an appropriate resource element by the resource element mapper, which is thereafter transmitted through an antenna after being generated as a SC-FDMA by the SC-FDMA signal generator.

Figure 6:
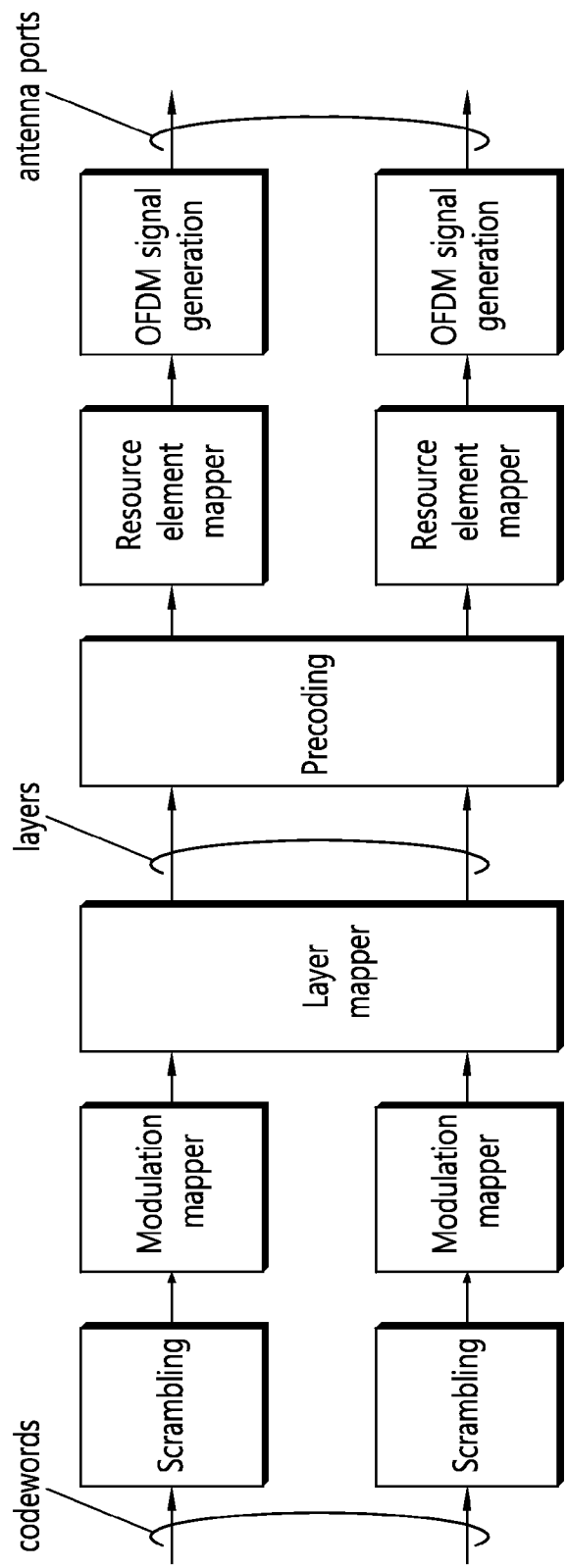
FIG. 6 shows an operation of processing a signal for PDSCH transmission in an LTE.

FIG. 6 shows an operation of processing a signal for PDSCH transmission in an LTE.

Coded data is formed by encoding data, which forms the transmission block, according to a predetermined coding scheme. The coded data is called a codeword, and the codeword may be scrambled as shown in Equation 4 above. Here, the scrambling sequence $c^{(q)}(i)$ may be initialized according to the transmission channel type as follows.

$$c_{init} = \begin{cases} n_{RNTI}\cdot 2^{14} + q\cdot 2^{13} + \lfloor n_s/2 \rfloor \cdot 2^9 + N^{cell}_{ID} & \text{for PDSCH} \\ \lfloor n_s/2 \rfloor \cdot 2^9 + N^{MBSFN}_{ID} & \text{for PMCH} \end{cases} \quad \text{Equation 6}$$

In Equation 6, $n_{RNTI}$ is a RNTI related with PDSCH transmission, and more particularly, a RNTI which is used in detecting the PDCCH which schedules the PDSCH.

The scrambled codeword is generated as an OFDM signal after going through modulation by the modulation mapper, layer mapping by the layer mapper, precoding, resource element mapping by the resource element mapper, and is then transmitted through the antenna.

As described above with reference to FIGS. 5 and 6, the scrambling sequence $c^{(q)}(i)$, which is used in the PUSCH or PDSCH transmission, is made by generating an initial value based on the RNTI and cell ID ($N^{cell}_{ID}$) which are used in detecting PDCCH which is a control channel that schedules the PUSCH or PDSCH. That is, the scrambling sequence, which is distinguished for each control channel (PDCCH) which schedules the data channel, is used in the data channel (PUSCH/PDSCH) for each UE.

Hereinafter, the present invention will be described.

The wireless communication system such as LTE-A may support a low price/low performance UE which is mainly used for data communication such as gauge examination, level measurement, utilization of a monitoring camera, and the inventory reporting of a vending machine. Such a UE will be called a machine-type communication (MTC) UE here for the convenience of description.

In the case of the MTC UE, the amount of data transmitted by each UE and the amount of data transmitted to each UE are small, but the number of UEs, which need to be supported by one base station, is large. Hence, signaling for up/downlink scheduling for every subframe for up/downlink data/control information transmission for each UE may be a big burden to the base station. Furthermore, the efficiency of the wireless resource use may become low. That is, in a situation when the amount data to be transmitted to each UE and the amount of data to be transmitted to the base station by each UE are very small, transmitting DL grant/UL grant for scheduling the data channel to each UE having a lot of base stations, and allocating the downlink data channel/uplink data channel according to the DL grant/UL grant have a high ratio of the control information transmission amount compared to the data transmission amount, and thus the use efficiency of wireless resources becomes low.

In order to solve such a problem, group scheduling may be used.

The group scheduling is performing scheduling by transmitting the UL grant/DL grant through one PDCCH to the UE group including a plurality of UEs. At this time, a common identifier may be allocated to the UE group. Likewise, a common identifier, which is provided to the UE group for identifying the control information, is called a group identifier (G-ID) or a group RNTI. The group ID is common to all UEs within the cell in a sense that the group ID is common to a specific UE group within the cell, and is different from the cell ID which is provided through a synchronization signal.

The group ID may be masked to the CRC of the PDCCH (more specifically DCI), which is provided to the UE group, so as to be transmitted. The UEs, which are included in the UE group, may damask the PDCCH with the group ID, and, if there is no error, the UEs may be recognized as their own PDCCH. Hence, the UEs, which are allocated the same group ID, may share the PDCCH which is used in the group scheduling.

Furthermore, even if the UE receives group scheduling, the UE may be allocated the UE's unique personal ID (P-ID) at the time of an initial connection to the network, and such a personal ID may be needed to receive a UE-specific RRC setting. The P-ID may be an ID which is allocated in a UE-specific manner. The P-ID is different from a UE-group-specific group ID (G-ID) in that the P-ID is UE-specific.

Figure 7:
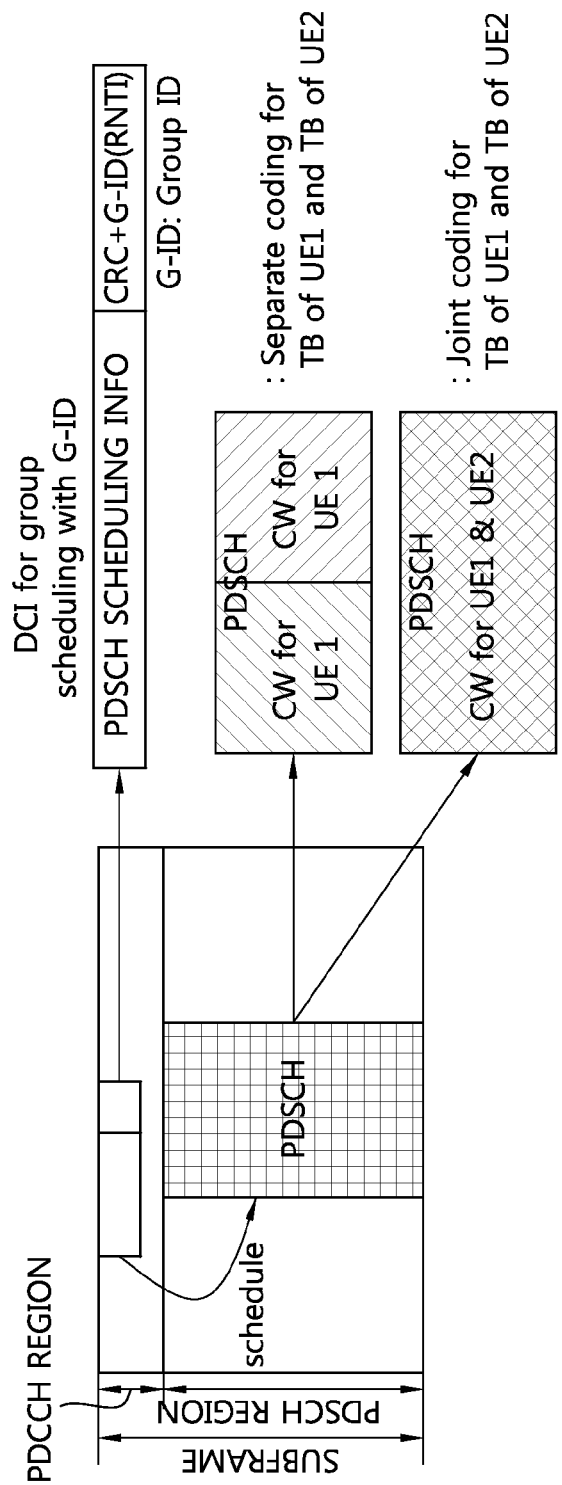
FIG. 7 shows a group scheduling using a group ID, according to an embodiment of the present invention.

FIG. 7 shows a group scheduling using a group ID, according to an embodiment of the present invention.

Referring to FIG. 7, in the PDCCH area of a specific subframe, the DCI (may be called group control information for convenience of description), in which the group ID is masked to the CRC, may be transmitted. In the case of the downlink, the DCI may include PDSCH scheduling information (e.g., DL grant) and CRC which is masked to the group ID.

The PDSCH scheduling information indicates a PDSCH area where the data for the UE group, which is allocated the group ID, may be transmitted. The UE group may be called a group search space in a sense that the data may be detected in the PDSCH area. In the PDSCH area, transport blocks (TB) to be transmitted to the group-scheduled UEs may be separate-coded or joint-coded. In the separate coding, transport blocks for each UE are individually channel-coded. In the joint coding, the transport blocks for each UE are multiplexed and are then channel-coded together. Some examples, which may be used in the channel coding, are turbo coding, and the coding rate may be ⅓.

In the case of the separate coding, the data for each UE may be transmitted through the resources which are distinguished in the time, frequency, code, or space, within the PDSCH area (group search space). In this case, the resource area within the PDSCH area, in which each of the UEs, which belong to the same UE group, is to receive data, may be set in advance through the upper layer signal such as a radio resource control (RRC) signal. Likewise, the information, which indicates the relative position of the PDSCH for a specific UE, within the PDSCH area (group search space) indicated by the group control information, is called data allocation location information.

Furthermore, the PDSCH scheduling information may include transport block (TB) size information which indicates the transport block size applied to one UE or the sum of transport block sizes of UEs which are group-scheduled.

Furthermore, the information on the number of actual UEs, which are group-scheduled within the same subframe, may be included in the PDSCH scheduling information or may be transmitted separately from the PDSCH scheduling information, which will be described later in detail with reference to FIG. 15.

Furthermore, in the uplink transmission, the data transmission of the UE may be performed as follows. First, the UE, which belongs to the UE group, receives the PUSCH scheduling information (e.g., a UL grant) to which the CRC masked to the group ID of the UE group is added. In this case, the PUSCH scheduling information is group control information. The UE may transmit the uplink data of the UE using the wireless resources which are distinguished in the time, frequency, code, or space, in the PUSCH area indicated by the UL grant. The resource area within the PUSCH area, in which the UE, which belongs to the UE group, transmits uplink data, and the cyclic shift (CS) offset value of the demodulation reference signal (DMRS), etc. may be set in advance through the upper layer signal such as the radio resource control.

As described above, when the scheduling information (PDSCH scheduling information and PUSCH scheduling information) is shared by a plurality of UEs, different scrambling is needed in data of each of the plurality of UEs. In the present invention, the scrambling sequence is generated using a unique P-ID which is allocated only to a specific UE and is different from the group ID, which is used for detecting scheduling information for group scheduling.

In the description below, it is assumed that UE 1 and UE 2 are UEs which belong to the same UE group so as to be group-scheduled. That is, UE 1 and UE 2 have been allocated the same group ID. Furthermore, the personal ID of UE 1 is called P-ID 1, and the personal ID of UE 2 is called P-ID 2.

Figure 8:
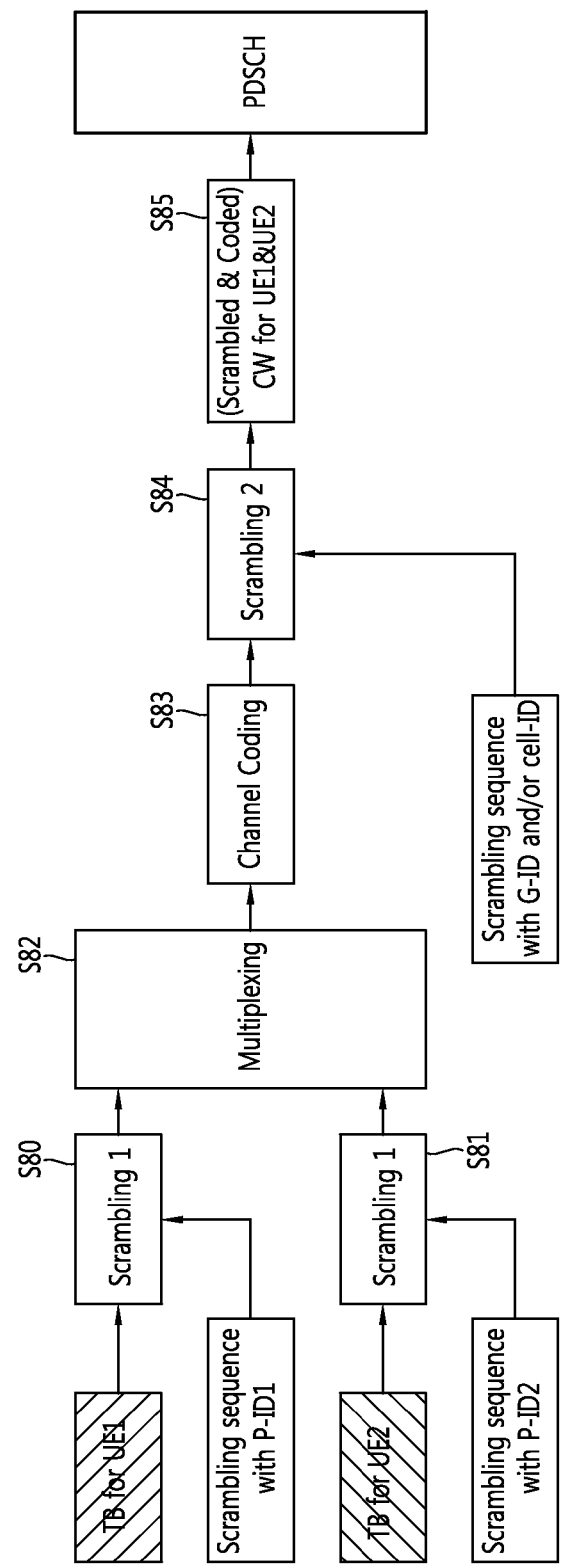
FIG. 8 shows an example of a process operation when transmission blocks for UE 1 and UE 2, which belong to the same UE group, is joint-coded.

FIG. 8 shows an example of a process operation when transmission blocks for UE 1 and UE 2, which belong to the same UE group, is joint-coded.

Referring to FIG. 8, the transport block on UE 1 is first-scrambled by the scrambling sequence generated based on P-ID 1 which is the personal ID of UE 1 (S80). The transport block for UE 2 is first-scrambled by the scrambling sequence generated based on P-ID 2 which is the personal ID of UE 2 (S81).

Thereafter, the transport block for UE 1 and the transport block for UE 2 are multiplexed (S82) and are channel-coded (S83) so as to be generated as a codeword. The codeword is second-scrambled by the scrambling sequence generated based on the group ID (S84). The scrambling sequence used in the second scrambling may be generated through the cell ID instead of the group ID, or may be generated using both the group ID and the cell ID.

For example, the initial value of the scrambling sequence may be generated as follows for reverse compatibility with the generation structure of the scrambling sequence used in the existing LTE (when the cell ID is composed of 8 bits).

$$c_{init}=n_{G\text{-}ID}\cdot 2^{14}+q\cdot 2^{13}+\lfloor n_s/2\rfloor\cdot 2^9+N_{ID}^{cell} \quad \text{Equation 7}$$

In Equation 7, $n_{G\text{-}ID}$ denotes group ID

The second-scrambled codeword is transmitted through the PDSCH.

Figure 9:
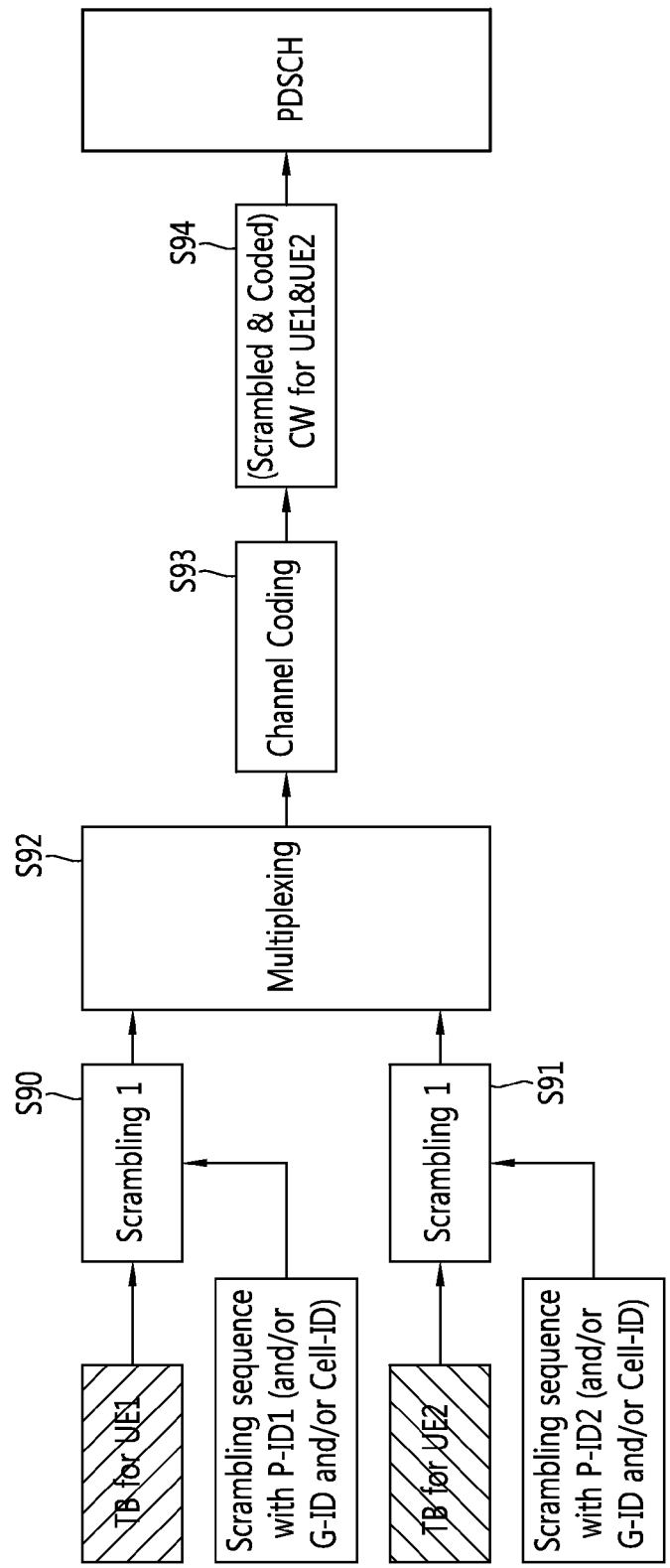
FIG. 9 shows another example of a process operation when transmission blocks for UE 1 and UE 2, which belong to the same UE group, is joint-coded.

FIG. 9 shows another example of a process operation when transmission blocks for UE 1 and UE 2, which belong to the same UE group, is joint-coded.

Unlike FIG. 8, in FIG. 9, the scrambling sequence used in the first scrambling (S90 and S91) may be generated based on any one of {personal ID and group ID}, {personal ID and cell ID}, and {personal ID, group ID, and cell ID}.

For example, if the group ID is x bits, the initial value of the scrambling sequence may be generated as follows.

$$c_{init}=n_{P\text{-}ID}\cdot 2^{14}+q\cdot 2^{13}+\lfloor n_s/2\rfloor\cdot 2^9+N_{ID}^{cell}$$

$$c_{init}=n_{P\text{-}ID}\cdot 2^{6+x}+q\cdot 2^{5+x}+\lfloor n_s/2\rfloor\cdot 2^{1+x}+N_{G\text{-}ID}$$

$$c_{init}=n_{P\text{-}ID}\cdot 2^{14+x}+q\cdot 2^{13+x}+\lfloor n_s/2\rfloor\cdot 2^{9+x}+n_{G\text{-}ID}\cdot 2^9+N_{ID}^{cell} \quad \text{Equation 8}$$

Furthermore, unlike FIG. 8, in FIG. 9, there is no second scrambling after the channel coding (S93). That is, the scrambling process exists only before the channel coding.

Figure 10:
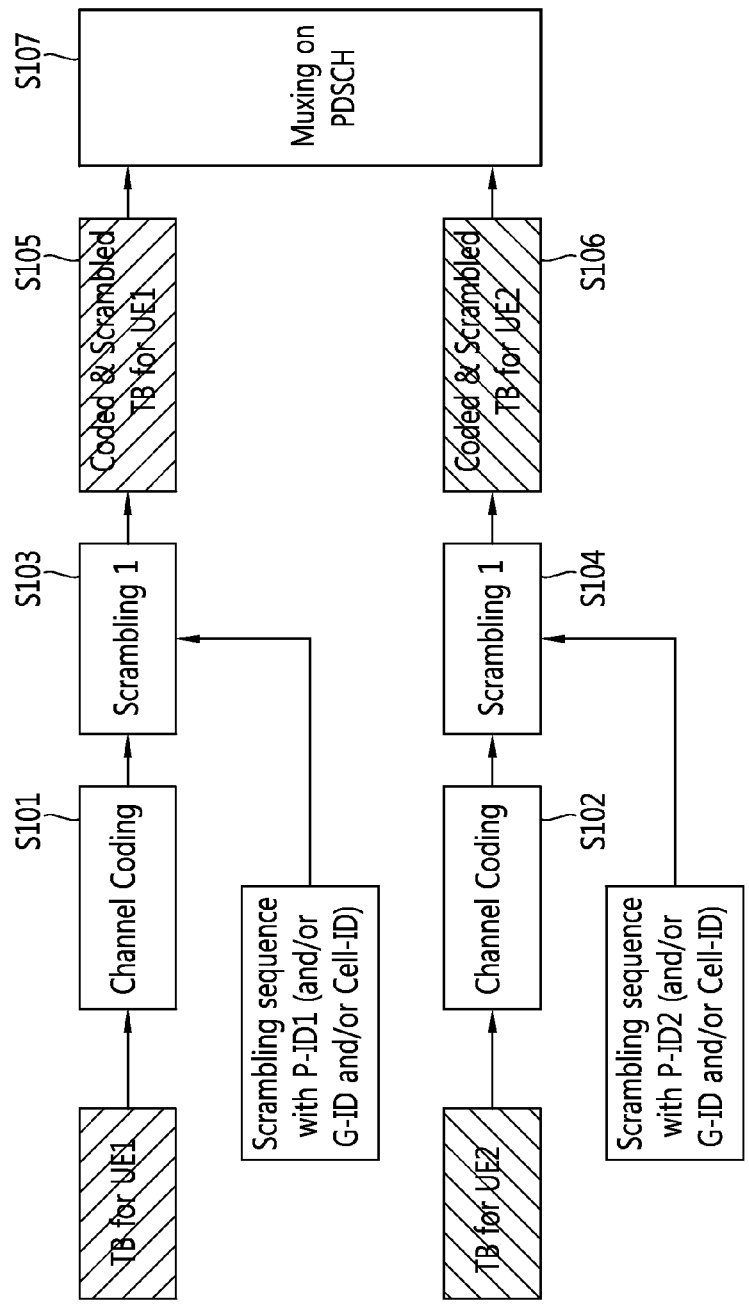
FIG. 10 shows a first example of a process operation when transmission blocks for UE 1 and UE 2, which belong to the same UE group, are separately coded.

FIG. 10 shows a first example of a process operation when transmission blocks for UE 1 and UE 2, which belong to the same UE group, are separately coded.

Referring to FIG. 10, the transport block of UE 1 channel-coded (S101), and is then scrambled (S103) by the scrambling sequence generated based on P-ID 1. The transport block of UE 2 is channel-coded (S102), and is then scrambled (S104) by the scrambling sequence generated based on P-ID 2. Likewise, the transport block (S105) of UE 1 and the transport block (S106) of UE 2, which have been individually channel-coded and scrambled, are multiplexed to the PDSCH (S107). Likewise, if the scrambling (S103 and S104) is performed after the channel coding (S101 and S102), data security is improved. That is, since descrambling needs to be first applied to P-ID in the decoding process of each UE, if the UE does not know the P-ID allocated to the UE itself, the descrambling needs to be performed with all possible P-IDs and then the decoding needs to be attempted. That is, more operations are required to break the data security.

Figure 11:
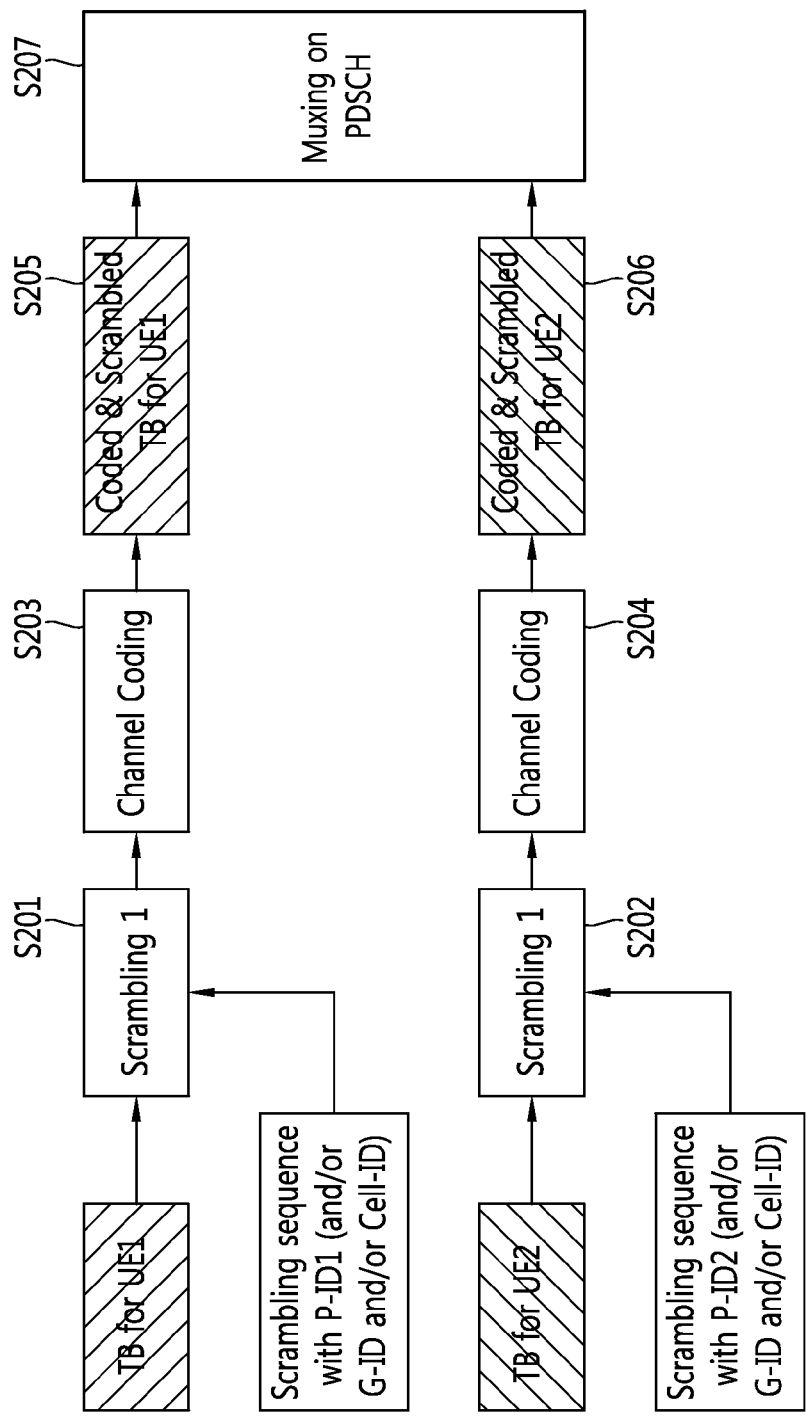
FIG. 11 shows a second example of a process operation when transmission blocks for UE 1 and UE 2, which belong to the same UE group, are separately coded.

FIG. 11 shows a second example of a process operation when transmission blocks for UE 1 and UE 2, which belong to the same UE group, are separately coded.

FIG. 11 is different from FIG. 10 in the order of the channel coding and the scrambling. That is, unlike FIG. 10, in FIG. 11, the transport block for UE 1 and the transport block for UE 2 are first scrambled to the scrambling sequence generated based on individual P-ID (S210 and S202), and are then channel-coded (S203 and S204). That is, the scrambling is performed before channel coding.

An example that the scrambling sequence is generated based on P-ID has been described with reference to FIGS. 10 and 11, but is not limited thereto. That is, the scrambling sequence may be generated based on one of {personal ID and group ID}, {personal ID and cell ID}, and {personal ID, group ID, and cell ID}. For example, the scrambling sequence may be generated as follows.

$$c_{init} = n_{P\text{-}ID} \cdot 2^{14} + q \cdot 2^{13} + \lfloor n_s/2 \rfloor \cdot 2^9 + N_{ID}^{cell}$$

$$c_{init} = n_{P\text{-}ID} \cdot 2^{6+x} + q \cdot 2^{5+x} + \lfloor n_s/2 \rfloor \cdot 2^{1+x} + n_{G\text{-}ID}$$

$$c_{init} = n_{P\text{-}ID} \cdot 2^{14+x} + q \cdot 2^{13+x} + \lfloor n_s/2 \rfloor \cdot 2^{9+x} + n_{G\text{-}ID} \cdot 2^9 + N_{ID}^{cell} \quad \text{Equation 9}$$

Figure 12:
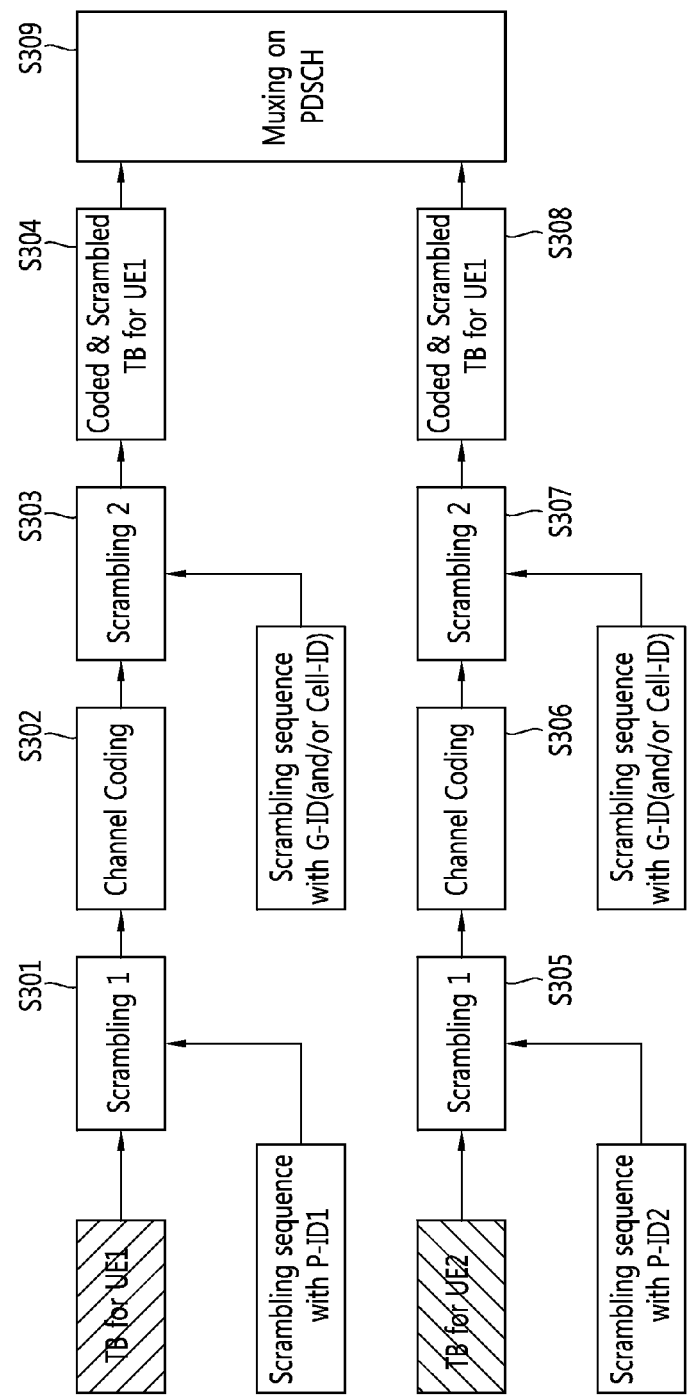
FIG. 12 shows a third example of a process operation when transmission blocks for UE 1 and UE 2, which belong to the same UE group, are separately coded.

FIG. 12 shows a third example of a process operation when transmission blocks for UE 1 and UE 2, which belong to the same UE group, are separately coded.

Referring to FIG. 12, the transport block for UE 1 is first-scrambled to the scrambling sequence generated based on P-ID 1 (S301), is then channel-coded (S302), and is then second-scrambled with the scrambling sequence generated based on G-ID (S303). The transport block for UE 2 is first-scrambled with the scrambling sequence generated based on P-ID 2 (S305), is then channel-coded (S306), and is then second-scrambled with the scrambling sequence generated based on G-ID (S307). Likewise, transport blocks, which have been individually scrambled and channel-coded (S304 and S308), are multiplexed to the PDSCH (S309).

Figure 13:
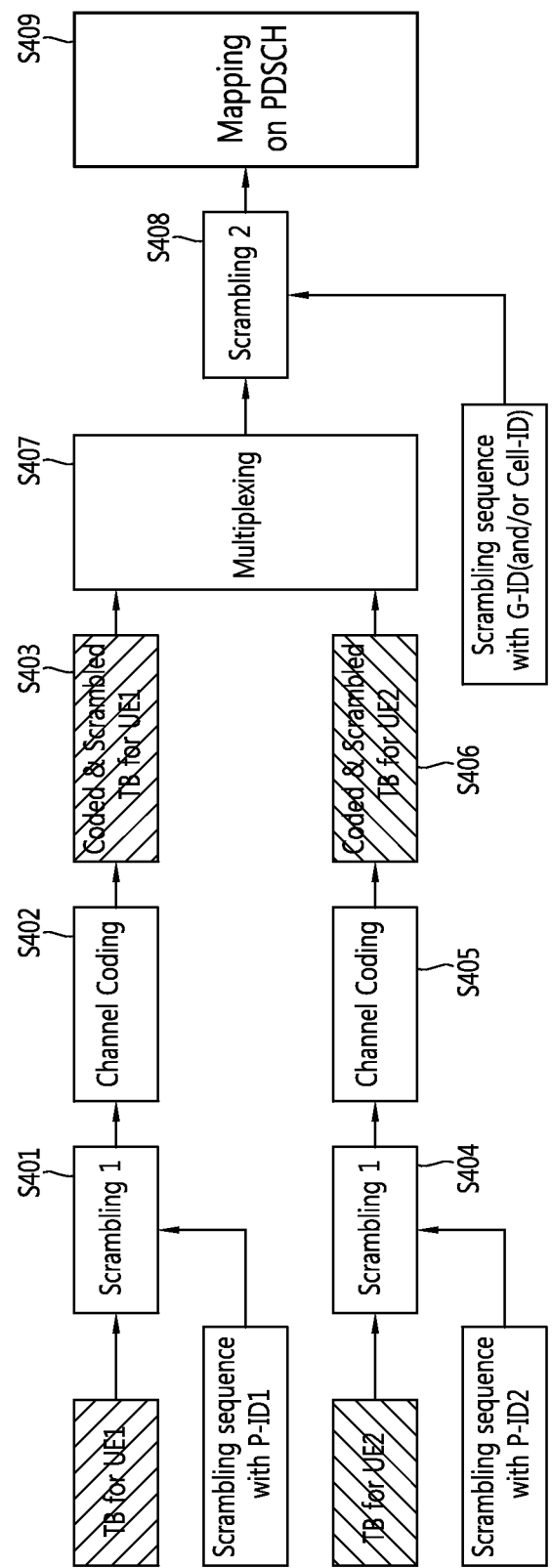
FIG. 13 shows a fourth example of a process operation when transmission blocks for UE 1 and UE 2, which belong to the same UE group, are separately coded.

FIG. 13 shows a fourth example of a process operation when transmission blocks for UE 1 and UE 2, which belong to the same UE group, are separately coded.

Unlike FIG. 12, in FIG. 13, transport blocks of respective UEs, which have been first-scrambled (S401 and S404) and channel-coded (S402 and S405), are first multiplexed (S407), and are then second-scrambled with the scrambling sequence generated based on the group ID (S408).

Figure 14:
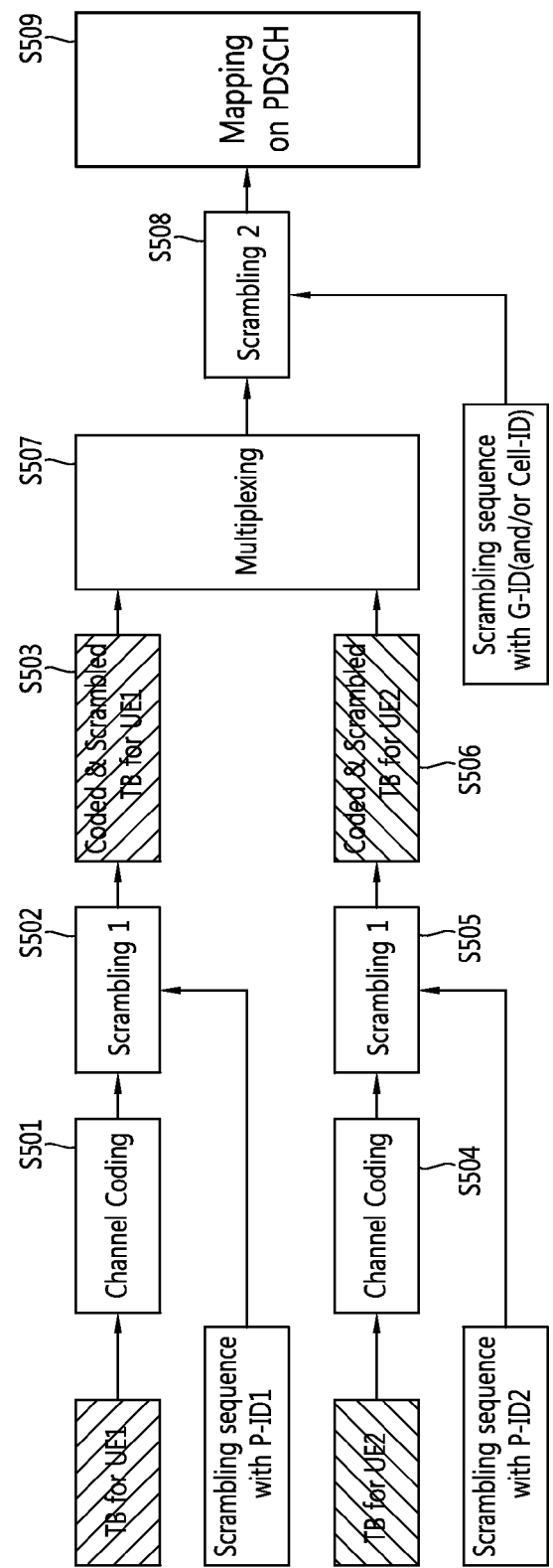
FIG. 14 shows a fifth example of a process operation when transmission blocks for UE 1 and UE 2, which belong to the same UE group, are separately coded.

FIG. 14 shows a fifth example of a process operation when transmission blocks for UE 1 and UE 2, which belong to the same UE group, are separately coded.

Unlike FIG. 13, in FIG. 14, transport blocks for respective UEs are channel-coded (S501 and S504), and are then first-scrambled (S502 and S505). Likewise, if the scrambling (S502 and S505) is performed after the channel coding (S501 and S504), data security is improved. That is, since descrambling needs to be first applied to P-ID in the decoding process of each UE, if the UE does not know the P-ID allocated to the UE itself, descrambling needs to be performed with all possible P-IDs and then decoding needs to be attempted. That is, more operations are required to break data security.

In FIGS. 12 to 14, the scrambling sequence used in the second scrambling may be generated based on the cell ID instead of G-ID or may be generated by using G-ID and cell ID together. The scrambling sequence used in the second scrambling may be generated as follows.

$$c_{init} = n_{G\text{-}ID} \cdot 2^{14} + q \cdot 2^{13} + \lfloor n_s/2 \rfloor \cdot 2^9 + N_{ID}^{cell} \quad \text{Equation 10}$$

In FIGS. 8 to 14, the multiplexing may be concatenating the bit row for each UE in order or interleaving the bit row to be mixed. At this time of interleaving, interleaving may be performed in bit group units which are interleaved in 1 bit unit or form a modulation symbol (e.g., a bit group which is formed of 1 bit in the case of BPSK, 2 bits in the case of QPSK, 4 bits in the case of 16QAM, and 6 bits in the case of 64QAM).

Figure 15:
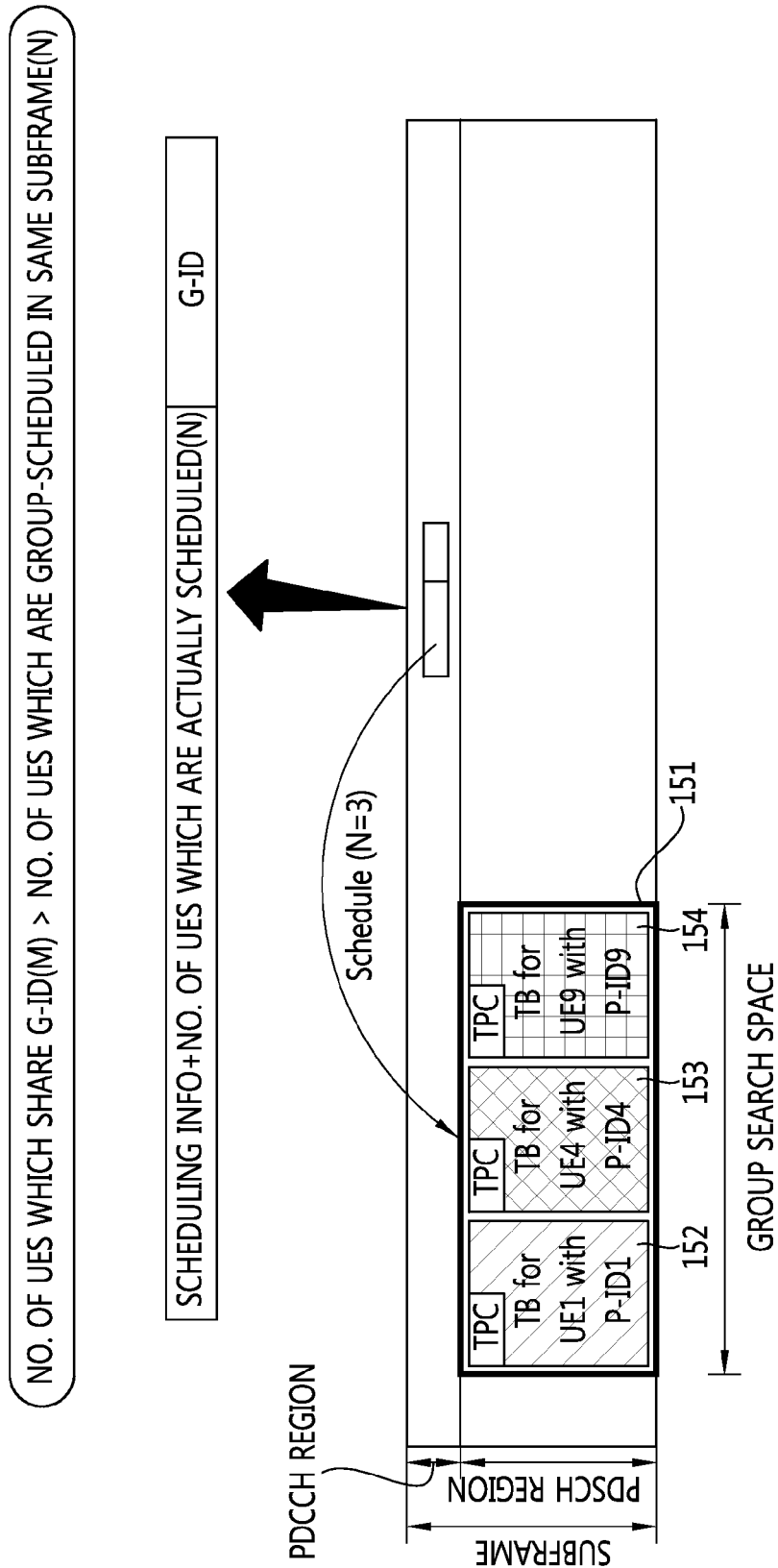
FIG. 15 shows an example of group control information provided by a base station, a group search space indicated by the group control information, and a search space where a certain UE performs a search.

FIG. 15 shows an example of group control information provided by a base station, a group search space indicated by the group control information, and a search space where a certain UE performs a search.

Referring to FIG. 15, at the time of group scheduling, the base station may transmit group control information (DCI) with which the group ID is masked to the CRC in the PDCCH area of a specific subframe. The group control information may include scheduling information (PDSCH scheduling information) which indicates the group search space 151 and number information which indicates the number of UEs which are scheduled by the actual group scheduling within the same subframe. The group search space 151 refers to the search space which searches for control information by UEs which are allocated the group ID. The group search space 151 may be predetermined to be partitioned equally by as many as the number of UEs which are actually group-scheduled between the base station and the UE.

The number of UEs (indicated by M), which share the group ID, may be different from the number of UEs (indicated by N), which are scheduled by the actual group control information. That is, group scheduling may performed for N UEs in the UE group including M UEs. N is a value equal to or less than M. Hence, the group control information may include the number information.

The number of UEs, which are actually group-scheduled through the number information, may be recognized, and as a result, the basis position of the search space, where the blinding decoding needs to be actually performed, in the search space, may be recognized.

For example, it is assumed that the number of UEs, which share the group ID, is 9 (UE1 to UE9) (i.e., M=9), and the number of UEs, which are actually scheduled by the group scheduling in a specific subframe, is 3 (UE 1, UE 4, and UE 9) (i.e., N=3).

Furthermore, it is assumed that the group search space indicated by the scheduling information included in the group control information is composed of 12 RB. For example, in UE 1, the group search space is composed of 12 RB by the scheduling information. Furthermore, the number of UEs, which are actually group-scheduled, is 3 by the number information. In this case, the rule that the group search space is partitioned equally by as many as the number of UEs which are actually scheduled may be predetermined between UEs. Then in UE 1, the group search space is partitioned by three sections. That is, the group search space is partitioned by 4 RB units. Likewise, each of the search spaces composed of 4 RB may be understood as a search space partitioned for separation from the group search space.

UE 1 may attempt blind decoding using a scrambling sequence generated based on P-ID 1 at each of the three partitioned search spaces composed of 4 RB.

Furthermore, UE 1 may be directed on the partition of the search space (e.g., the first partitioned search space 152) at which the downlink data is to be received within the search space (group search space) which is semi-statically indicated in advance by the group control information through the upper layer signal such as a radio resource control (RRC) signal. In this case, blind decoding does not need to be tried in all partitioned search spaces, and blind decoding needs to be tried only in a specific partitioned search space.

Figure 16:
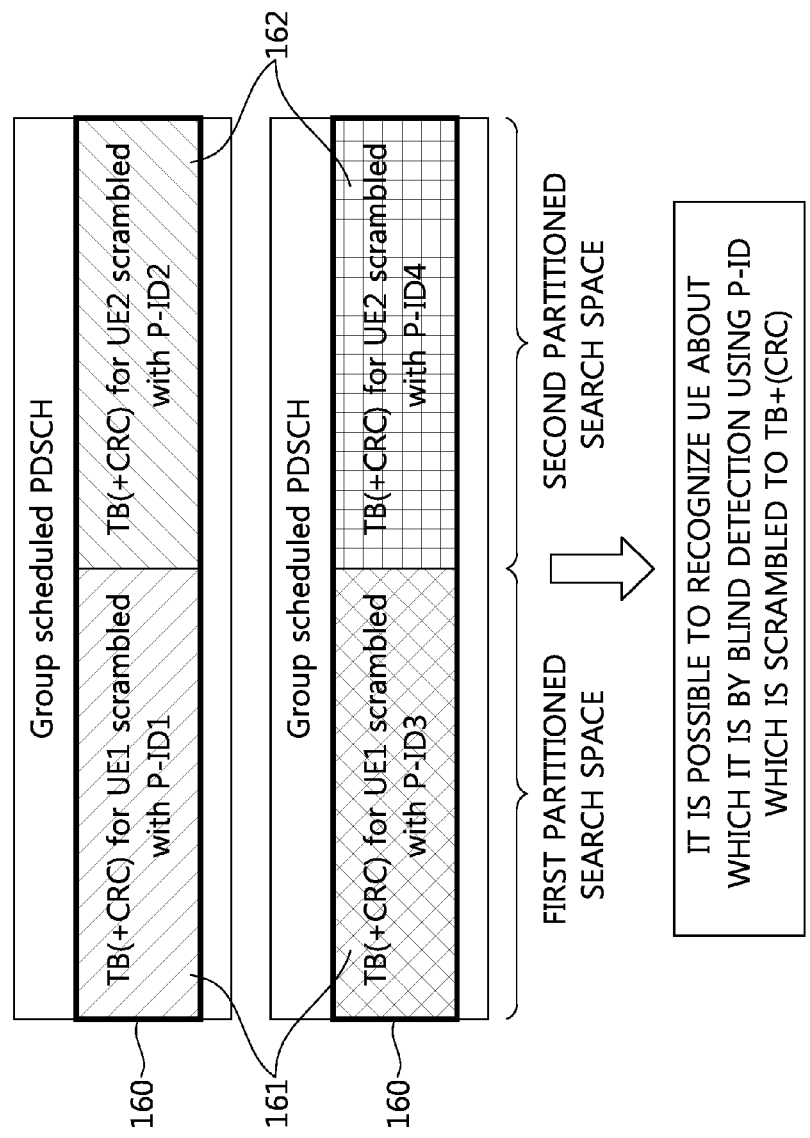
FIG. 16 shows an example of a method of dividing a transmission block for each UE when the number of UEs which share the group ID is different from the number of UEs which are scheduled by the actual group control information at the time of group scheduling.

FIG. 16 shows an example of a method of dividing a transmission block for each UE when the number of UEs which share the group ID is different from the number of UEs which are scheduled by the actual group control information at the time of group scheduling.

Referring to FIG. 16, the number of UEs, which share the group ID at the time of group scheduling, may be 4, the number of UEs, which are actually scheduled, may be 2. FIG. 16 illustrates the same subframe twice in the upper side and the lower side. As illustrated in FIG. 16, partitioned search spaces, which are predetermined through the RRC signal between different UEs, may overlap. For example, a first partitioned search space 161 of the group search space 160 may be set to UEs 1 and 3, and a second partitioned search space 162 of the group search space 160 may be set to UEs 2 and 4.

In this case, the base station may scramble the transport block for the UE with the scrambling sequence generated based on P-ID of each UE, and transmit the scrambled transport block.

Then each UE may decode the UE's data by performing blind decoding using the UE's P-ID in the partitioned search space. For example, UE 1 may set in advance the transmission of the UE's transport block in the first partitioned search space 161 through the upper layer signal such as the RRC message. UE 1 may determine whether the data is data allocated to the UE by performing blind decoding using P-ID 1 in the first partitioned search space 161.

Figure 17:
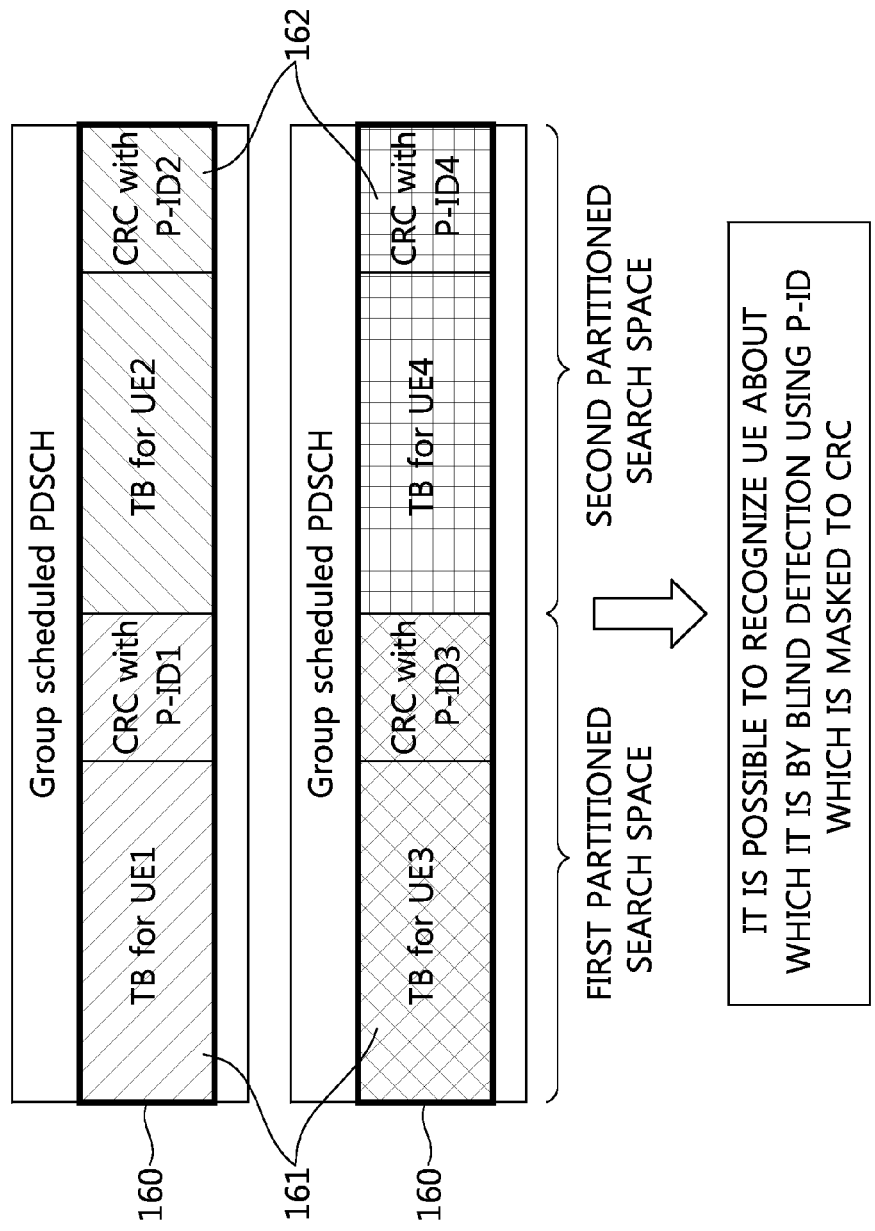
FIG. 17 is another example of a method of dividing a transmission block for each UE when the number of UEs which share the group ID is different from the number of UEs which are scheduled by the actual group control information at the time of group scheduling.

FIG. 17 is another example of a method of dividing a transmission block for each UE when the number of UEs which share the group ID is different from the number of UEs which are scheduled by the actual group control information at the time of group scheduling. FIG. 17 illustrates the same subframe twice in the upper side and the lower side.

In FIG. 16, the scrambling sequence generated based on P-ID is scrambled in the entire transport block including CRC, but in FIG. 17, the scrambling sequence generated based on P-ID is masked to only the CRC added to the transport block. That is, FIG. 16 illustrates the scheme of checking whether data received in the partitioned search space is the UE's data through blind decoding using P-ID of the scrambling sequence, and FIG. 17 illustrates the scheme of checking whether the data received in the partitioned search space is the UE's data through blind decoding using P-ID which is masked to CRC. The schemes of FIGS. 16 and 17 may be used separately or together.

When the position of the partitioned search space, which is set for each UE, is fixed, the data of the partitioned search space which is designated for each UE is buffered and combined until the detection by the P-ID of the UE after a new data indication (NDI) without the increase of the received buffer of the UE.

When the position of the partitioned search space, which is set for each UE, is not fixed, the data of all possible partitioned search spaces is buffered and combined until detection by the P-ID of the UE after NDI. In this case, the increase of the received buffer is needed.

Both schemes may have a disadvantage that when the transmission of only one of all group-scheduled data sets is successful and the transmission of the others fails, all of the data sets need to be retransmitted. In order to avoid such a disadvantage, the method of signaling an individual NDI for each data set which is group-scheduled, or operating as ARQ without HARQ combination (in this case, NDI is not needed) may be considered. Furthermore, transmission power control (TPC) and HARQ process number, etc. may be joint-coded.

The partitioned search space, where the UE needs to perform blind decoding, may be designated as one position within the group search space in order to minimize the number of times of blind decoding. Furthermore a plurality of locations (a plurality of partitioned search spaces) may be designated in advance as RRC for the degree of freedom at the sacrifice of the increase of the number of times of blind decoding.

Furthermore, the information on a plurality of partitioned search spaces, where the blind decoding is to be performed, may be transmitted through the PDCCH on the basis of one predetermined partitioned search space for each UE.

Furthermore, in order to avoid the partitioned search space designation through signaling, the blind decoding may be performed for all of the PDSCH/PUSCH which has been group-scheduled at the sacrifice of the increase of the number of times of blind decoding. This method may be useful even when M=N.

Figure 18:
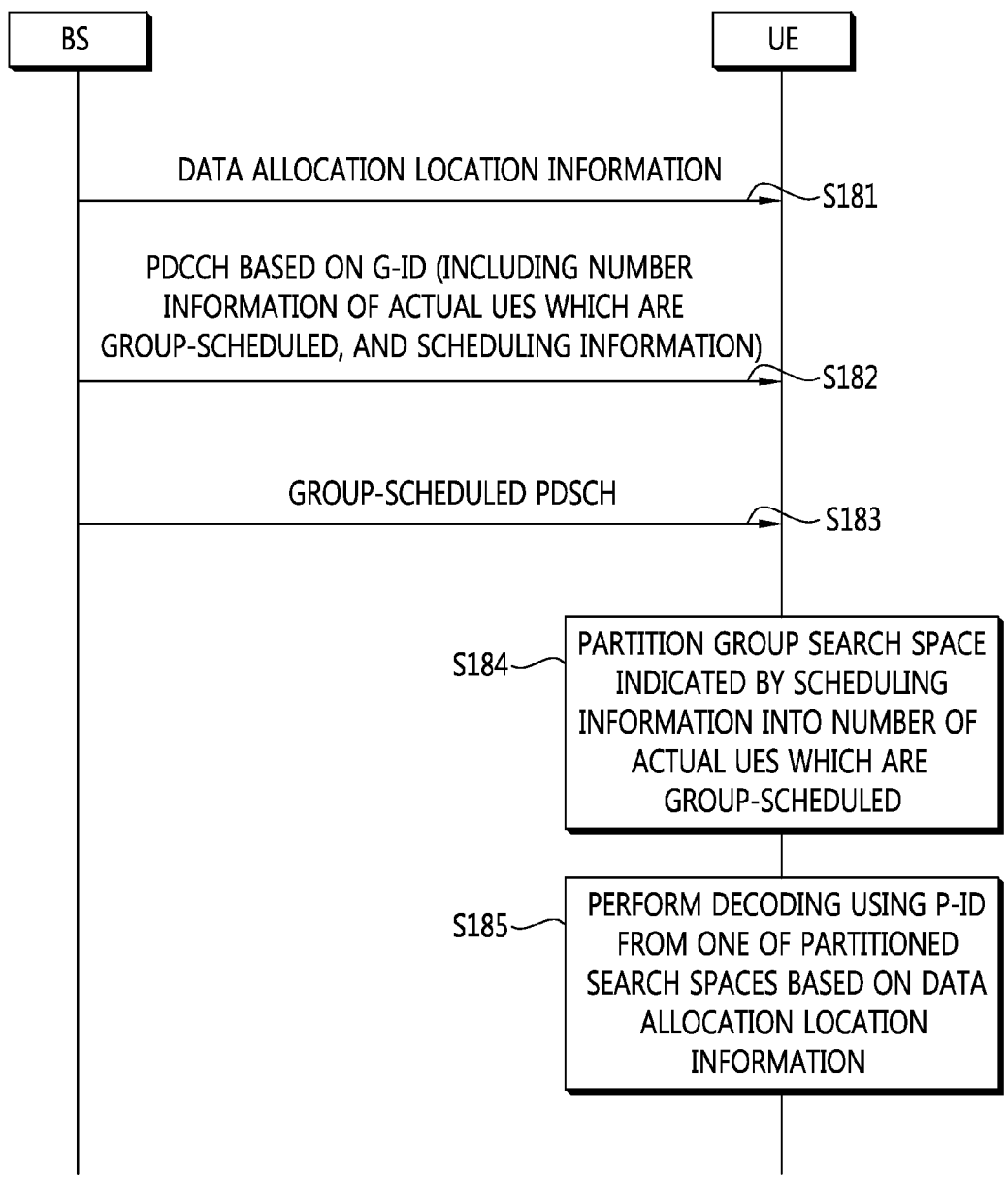
FIG. 18 shows a method of decoding data according to an embodiment of the present invention.

FIG. 18 shows a method of decoding data according to an embodiment of the present invention.

Referring to FIG. 18, the base station transmits data allocation position information to the UE (S181). The data allocation position information may be information which indicates the partitioned search space where the data for the UE is transmitted within the group search space.

The base station transmits the PDCCH based on the group ID (G-ID) to the UE (S182). That is, the group ID transmits the DCI, which is masked to CRC, to the UE. The PDCCH based on the group ID may include scheduling information and information on the number of actual UEs which are group-scheduled.

The base station transmits the group-scheduled PDSCH (S183). The group-scheduled PDSCH refers to the PDSCH through which data for a plurality of UEs, which have been allocated the same group ID, is transmitted.

The UE partitions the group search space indicated by the scheduling information into the number of actual UEs which are group-scheduled (S184). The partitioned group search space is called a partitioned search space as described above.

The UE decodes data using the UE's P-ID in one of partitioned search spaces based on the data allocation location information (S185).

Figure 19:
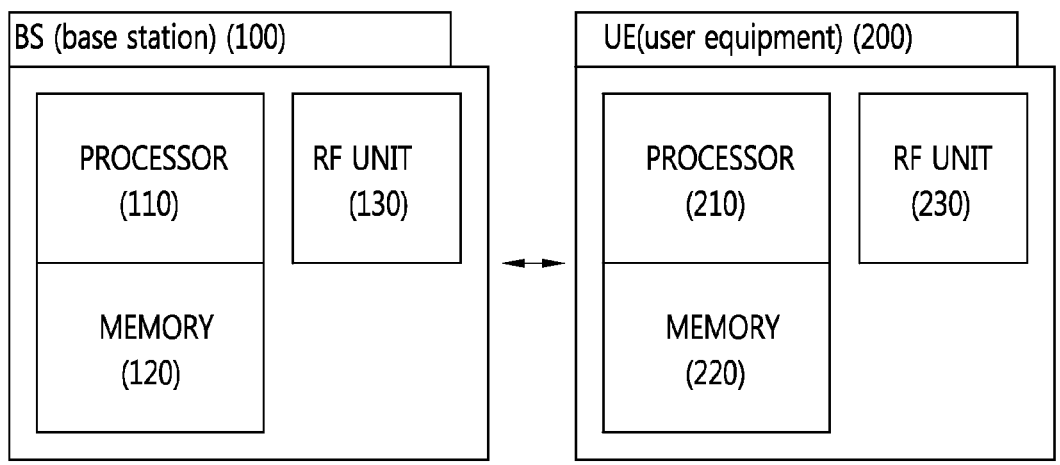
FIG. 19 shows a configuration of a base station and UE according to an embodiment of the present invention.

FIG. 19 shows a configuration of a base station and UE according to an embodiment of the present invention.

The base station includes a processor 110, a memory 120, and a radio frequency (RF) unit 130. The processor 110 implements a suggested function, process, and/or method. For example, the processor 110 transmits data allocation location information, PDCCH based on group ID, and group-scheduled PDSCH to the UE. The PDCCH may include scheduling information and number information of actual UEs which are group-scheduled. The scheduling information may indicate the group search space. FIGS. 8 to 14 illustrate the signal processing operation which is performed in the processor 110. The memory 120 is connected to the processor 110 and stores various information sets for operating the processor 110. The RF unit 130 is connected to the processor 110 and transmits and/or receives wireless signals.

The UE 200 includes a processor 210, a memory 220, and a RF unit 230. The UE 200 may be an MTC UE. The processor 210 implements a suggested function, process, and/or method. For example, the processor 210 may receive data allocation location information, PDCCH based on group ID, and group-scheduled PDSCH from the base station. Thereafter, the group search space indicated by the scheduling information is partitioned into the number of actual UEs which are group-scheduled, and the decoding may be performed using P-ID from one of the partitioned search spaces based on the data allocation location information. The memory 220 is connected to the processor 210 and stores various information sets for operating the processor 210. The RF unit 230 is connected to the processor 210 and transmits and/or receives wireless signals.

The processor 110 or 210 may include an application-specific integrated circuit (ASIC), another chipset, a logic circuit, a data processing device, and/or a converter which mutually converts a baseband signal and a wireless signal. The memory 120 or 220 may include a read-only memory (ROM), a random access memory (RAM), a flash memory, a memory card, a storage medium, and/or another storage device. The RF unit 130 or 230 may include one or more antennas which transmits and/or receive a wireless signal. When the embodiment is implemented as software, the above-described scheme may be implemented as a module (process, function, etc.) which performs the above-described function. The module may be stored in the memory 120 or 220, and may be executed by the processor 110 or 210. The memory 120 or 220 may be positioned inside or outside the processor 110 or 210, and may be connected to the processor 110 or 210 in various well-known ways.

What is claimed is:

1. A method of decoding data performed by a user equipment (UE) in a wireless communication system, the method comprising:
    receiving group control information in a physical downlink control channel (PDCCH) region;
    receiving the data for a plurality of UEs in a group search space located in a physical downlink shared channel (PDSCH) region based on the group control information; and
    decoding the data for the plurality of UEs using a unique ID of the UE to acquire data specifically for the UE in the group search space,
    wherein the group control information includes:
        scheduling information indicating the location of the group search space,
        number information indicating a number of UEs which are scheduled by the group control information in a same subframe, and
        data allocation position information indicating a partitioned search space where the data specifically for the UE is transmitted within the group search space,
    wherein the group search space is partitioned into a number of search spaces at least equaling the number of UEs indicated by the number information, and
    wherein the data specifically for the UE is acquired in the partitioned search space indicated by the data allocation position information.

2. The method of claim 1, wherein each of the partitioned search spaces is generated by partitioning the group search space equally by the number of UEs which are scheduled within the same subframe by the group control information in a frequency domain.

3. The method of claim 1, wherein the number of UEs, which are scheduled within the same subframe by the group control information, is less than the number of UEs to which a group ID has been allocated.

4. The method of claim 1, wherein the data is channel-coded and is then scrambled, and a scrambling sequence used in the scrambling is a sequence generated based on the unique ID of the UE.

5. The method of claim 1, wherein the data is channel-coded, is then first-scrambled, and is then second-scrambled, and a first scrambling sequence used in the first scrambling is a unique sequence generated based on the unique ID of the UE and a second scrambling sequence used in the second scrambling is a group sequence generated based on the group ID.

6. The method of claim 1, wherein the group control information includes a cyclic redundancy check (CRC) which is masked to a group identifier (ID) allocated to the plurality of UEs.

7. A user equipment (UE) comprising:
    a radio frequency (RF) unit which transmits and receives a wireless signal; and
    a processor connected to the RF unit,
    wherein the processor receives group control information in a physical downlink control channel (PDCCH) region, receives data for a plurality of UEs in a group search space located in a physical downlink shared channel (PDSCH) region based on the group control information and decodes the data for the plurality of UEs using a unique ID of the UE to acquire data specifically for the UE in the group search space,
    wherein the group control information includes:
        scheduling information indicating the location of the group search space,
        number information indicating a number of UEs which are scheduled by the group control information in a same subframe, and
        data allocation position information indicating a partitioned search space where the data specifically for the UE is transmitted within the group search space,
    wherein the group search space is partitioned into a number of search spaces at least equaling the number of UEs indicated by the number information and
    wherein the data specifically for the UE is acquired in the partitioned search space indicated by the data allocation position information.

* * * * *